A. G. HOLCOMBE & J. N. CRANDALL.
Magneto Electric Machine.
No. 236,399. Patented Jan. 4, 1881.
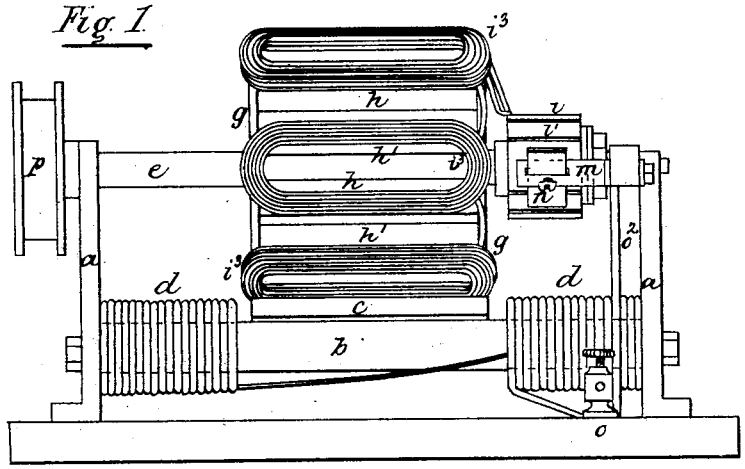
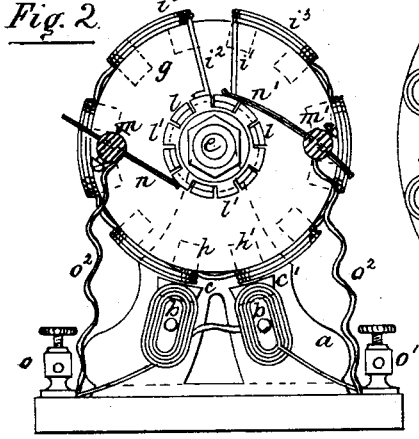
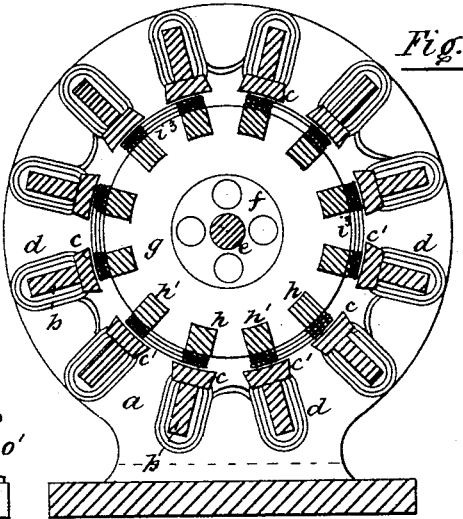
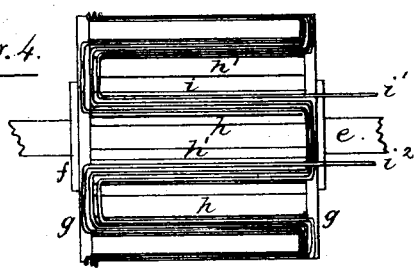
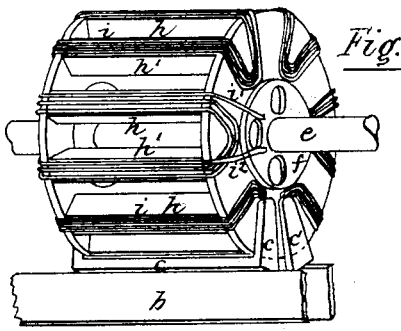
Witnesses.
Alfred G. Holcombe,
John N. Crandall.
Inventors.

UNITED STATES PATENT OFFICE.

ALFRED G. HOLCOMBE, OF NEW YORK, N. Y., AND JOHN N. CRANDALL, OF NORWICH, CONNECTICUT.

MAGNETO-ELECTRIC MACHINE.

SPECIFICATION forming part of Letters Patent No. 236,399, dated January 4, 1881.

Application filed January 23, 1880.

*To all whom it may concern:*

Be it known that we, ALFRED G. HOLCOMBE, of New York, N. Y., and JOHN N. CRANDALL, of Norwich, Connecticut, have jointly invented certain new and useful Improvements in Magneto-Electric Machines, of which the following is a specification.

This invention has for its object to increase the efficiency of magneto-electric machines by so arranging the conductor in which the electric current is induced that a greater proportion of its length is caused to pass through the magnetic field at right angles to the magnetic lines of force than has heretofore been done, and by preventing the iron body of the armature and the induced conductor becoming heated as they are caused to move in the magnetic field, by making the body of the armature of iron bars, of which there is an even number placed equidistant apart and fastened at their ends between two flat iron rings, the outer sides of the bars being flush with the peripheries of the rings, which are secured to the shaft by brass hubs or spiders, so the air has free access to the inside of it, both through the brass hubs or spiders and between the iron bars and different coils of the conductors, thus dissipating all heat from the iron and conductor as soon as it appears, thereby keeping the resistance of the conductor constant. The conductor in which the electric current is induced is wound longitudinally on the iron body of the armature, the greater part of its length being directly over the iron bars, which are parallel to the axis, and so caused to cut the lines of magnetic force at right angles, the whole of it forming one circuit, the two free ends of which are connected to the two parts of a commutator, each having half as many sections as there are bars in the iron body of the armature, arranged to pass alternately under two brushes or rubbers, to which the outside conductor is attached.

The inducing or field magnets consist of straight iron bars, their ends being secured to two iron frames, in which are provided bearings to receive the shaft of the armature. There are as many of these straight-bar magnets as there are bars in the armature, and they are provided with pole-pieces in their central parts of about the same length as the armature-bars, and are arranged in a circle, so as to be directly opposite said armature-bars when the machine is at rest; and each of them has a coil of insulated wire placed between the pole-pieces and the iron frames of the machine, said coils being so joined together that when an electric current is caused to traverse through them each alternate pole is of the same polarity, so that currents are induced in the conductor on the armature as the sections of it over the bars of the armatures move in front of the poles of the inducing-magnets. The bars of the armature, being behind the sections of the conductor, give direction to and concentrate the lines of magnetic force given out by the inducing-magnets. The brushes or rubbers are so adjusted that they change from one section of the commutator to another at the instant the change of direction of the current in the conductor takes place—that is to say, when each of its sections is moving from the influence of the magnet-poles of one polarity to that of the alternate poles of the other polarity.

To describe our invention more particularly, we will refer to the accompanying drawings, forming part of this specification, in which—

Figure 1 is a side elevation of our improved magneto-electric machine, showing two only of the inducing-magnets. Fig. 2 is an end view of the same with the side frame removed. Fig. 3 is a transverse sectional elevation, showing inducing-magnets entirely surrounding the armature. Fig. 4 is a side view of the armature, a modification of and illustrating the principle in which the induced conductor is wound on the iron body of the armature; and Fig. 5 shows a modification in which the wire is bent over the edge and onto the faces of the cylinder.

$a\ a$ represent the two iron side frames of the machine, held together by being secured to the ends of the straight iron bars $b\ b$, which form the cores of the inducing or field electro-magnets, two only of which are shown in Figs. 1 and 2, and twelve shown in Fig. 3, arranged in a circle equidistant apart. On their sides, toward the center of the circle—of which they are arranged on the radial lines—are secured the pole-pieces $c\ c'$, and between the ends of these pole-pieces and the inside of the side frames are placed, on the cores $b\ b$, the helices $d\ d$, and the whole of these helices are so connected together that all the pole-pieces marked $c\ c$ are of one polarity and those marked $c'\ c'$ of the opposite polarity when an electric current is caused to pass through the helices.

The frames $a\ a$, at the center of the circle formed by the straight bars or cores $b\ b$ of the field-magnets, are provided with bearings, in which the shaft $e$ is fitted to rotate, and on this shaft $e$ are secured the two brass hubs or spiders $f\ f$, to which are secured the two flat iron rings $g\ g$; or the rings may be substituted by disks, which are secured themselves to the shaft. These rings are connected together by the iron bars $h\ h'$, the number of which is equal to the number of the field-magnets; being twelve, as shown in the drawings, they are placed equidistant apart, so that each of them is opposite one of the twelve poles of the magnets at the same time. Holes are provided through the brass hubs or iron disks for the admission of air, allowing it to circulate freely around the bars $h\ h'$ and the sections of the conductor. In practice the armature will be proportionally longer than shown.

In Fig. 4 is illustrated one of the methods we employ in winding the conductor on the iron body of the armature, showing plainly the principle adopted by us—that is to say, the wire $i$ is laid along one of the bars $h$, the end of it showing at $i'$. It is then bent around and brought back on the next adjacent bar, $h'$, and so on forward and backward on the bars until it reaches the starting-point, this operation being repeated until sufficient wire is placed on the armature, the end then leaving the side of the armature, as at $i^2$, which is fastened to one series of the sections of the commutator, and the end $i'$ to the other series of sections, the construction of which will be hereinafter described.

It will be observed that the whole of the wire $i$ on the armature is in one circuit, and is connected to the commutator to collect the current by only two ends, and also that all of the wire running in one direction on the bars $h\ h$ is under the influence of the poles $c\ c$ of the field-magnets of one polarity, while all of the wire running in the other direction on the alternate bars $h'\ h'$ is under the influence of the poles $c'\ c'$ of the opposite polarity, so that the current induced in the wire $i$, as it is caused to cut the lines of magnetic force in moving over the poles $c\ c\ c'\ c'$ or the armature in making the one-twelfth of a revolution, is in one direction through the whole of the wire, the current changing and being in the opposite direction as the bars $h\ h'$ and wire $i$ move to and over the next adjacent poles of the magnet, thus giving twelve impulses for each revolution of the armature.

It will also be observed from this construction and arrangement of the wire that very little of it lies lengthwise in the direction of its travel through the magnetic field, so that the loss due to the resistance of this idle part of the wire is very slight.

Instead of winding the wire $i$ along the bars $h\ h'$, as just described, so that each separate convolution passes entirely around the armature, it may be passed over each two adjacent bars $h\ h'$ until the right quantity is in place, and then repeat the same operation on the next adjacent pair of bars, and so on until the whole of the armature is covered, thus forming a series of bobbins, as shown in Figs. 1, 2, and 3. This is the method we propose to adopt in practice, as it enables us to wind the bobbins $i^3\ i^3$ separately from the armature, and then secure them to the bars of it and connect the ends of the bobbins together in one circuit, so that the electric current will be induced in it, as before described, the commencing end of the first bobbin and the finishing end of the last bobbin being connected to the two parts of the commutator, which we will now describe.

The commutator consists of a cylindrical shell, $l$, of brass, secured to the shaft $e$ between the end of the armature and one of the side frames, $a$. This shell is cut away, as shown, leaving six plates a little narrower than the spaces between them. Another cylindrical shell, $l'$, is cut away in a similar manner, and the two placed and secured together, with insulating washers and sleeves between them, so that they are not in electrical contact, the six plates of the shell $l$ being in the six spaces in the shell $l'$, and vice versa. The end $i'$ of the wire $i$ is secured to the shell $l$ and the end $i^2$ to the shell $l'$. By using two plain cylinders and collecting-brushes in place of the sectional commutator an alternating current will be produced.

Two insulated posts, $m\ m'$, are attached to the frame $a$, and in slots in them are secured the rubbers or brushes $n\ n'$, which are adjusted to bear on the parts $l$ and $l'$ of the commutator in such a manner that when the brush $n$ is changing from the plates of $l$ to the plates of $l'$ the brush $n'$ is changing from the plates of $l'$ to the plates of $l$.

The posts $m$ and $m'$ and their brushes or rubbers $n$ and $n'$ are shown diametrically opposite each other; but they may be placed in any position, so that they relatively change from one set of plates of the commutator to the other, and are about to so change at the instant that the sections of the wire $i$ over the bars $h\ h'$ of the armature are between the poles of the field-magnets, or when the change of direction of the induced current occurs by the wire moving from the magnetic field of one polarity into the magnetic field of the opposite polarity. The posts $m$ and $m'$ are respectively connected to the two binding-posts $o$ and $o'$ by the wires $o^2\ o^2$.

The current induced in the conductor $i$ from the residual magnetism of the cores of the electro-magnets may be caused to traverse the helices of them, and by reciprocal action magnetize said cores to their maximum degree by connecting the ends of the helices to the posts $o$ $o'$, so that they are in multiple circuit with the outside conductor, or they may be placed in continuous circuit therewith.

The number of field-magnets and bars in the armature may be varied to accord with the size of or the purpose to which the machine is to be applied. It is evident that the same result will attain if the armature is held stationary and the field-magnets are caused to revolve around it. $p$ is the driving-pulley.

The principle of winding the wire, as shown at Fig. 4, may be still further carried out by bending the wire $i$ over the edge of the cylindrical armature down toward the shaft, then back over the edge and along the face to the other side, and so on until the whole armature is covered, as shown at Fig. 5, the poles $c$ and $c'$ of the magnets being bent up in close proximity to the ends of the armature; also, this principle of winding the wire on armatures of magneto-electric machines may be applied to solid cylindrical armatures.

Having now described our invention, what we claim, and desire to secure by Letters Patent, is—

1. A magneto-electric machine in which the whole induced conductor, wound to and fro longitudinally on a cylindrical armature and having no pole-pieces projecting between its sections, is in one circuit, with only two free ends, in combination with a series of field-magnets, substantially as and for the purpose hereinbefore set forth.

2. The armature of a magneto-electric machine, composed of the disks or rings $g$ $g$, with or without the brass hubs $f$ $f$ and bars $h$ $h$, in combination with the conductor $i$, wound longitudinally to and fro thereon and secured to the bars $h$ $h$, substantially as set forth.

3. An armature for a magneto-electric machine, composed of a magnetic cylinder, either solid or with interstices, having a conductor wound to and fro on the face or faces thereof, in one circuit, with only two free ends, with no pole-pieces projecting between the sections of the conductor, substantially as and for the purposes hereinbefore set forth.

In testimony whereof we have hereunto set our hands this 20th day of January, 1880.

ALFRED G. HOLCOMBE.
JOHN N. CRANDALL.

Witnesses:
ALFRED SHEDLOCK,
H. D. WILLIAMS.